Nov. 22, 1949     L. S. WOOD     2,488,790
TRUCK BODY HOISTING MECHANISM

Filed March 7, 1947     3 Sheets-Sheet 1

INVENTOR.
*Louis S. Wood*
BY
ATTORNEYS

Nov. 22, 1949 L. S. WOOD 2,488,790
TRUCK BODY HOISTING MECHANISM
Filed March 7, 1947 3 Sheets-Sheet 3

INVENTOR.
Louis S. Wood
BY
ATTORNEYS

Patented Nov. 22, 1949

2,488,790

UNITED STATES PATENT OFFICE 2,488,790

TRUCK BODY HOISTING MECHANISM

Louis S. Wood, Burlingame, Calif.

Application March 7, 1947, Serial No. 732,953

4 Claims. (Cl. 298—19)

This invention relates to hoisting mechanisms, and more particularly to a mechanism adapted for the hoisting of a dump type truck body.

An object of the invention is to provide a truck body hoisting mechanism embodying cam take-off means adapted to translate the linearly applied force of a hydraulic piston to a variable effective body hoisting force in accordance with optimum requirements during the various stages of lift of the truck body.

Another object of the invention is to provide a truck body hoisting mechanism embodying a hydraulic piston and means operably associated therewith to translate the linear movement of the piston to a body hoisting force, said means providing an initial hoisting force primarily produced by a camming action, an intermediate hoisting force primarily produced by direct thrust action, and, at a predetermined point of abrupt transition, a final lifting force produced solely by a direct thrust action.

Other objects and advantages of the invention will be apparent from the following description taken in conjunction with the drawings forming part of this specification, and in which.

Figure 1:
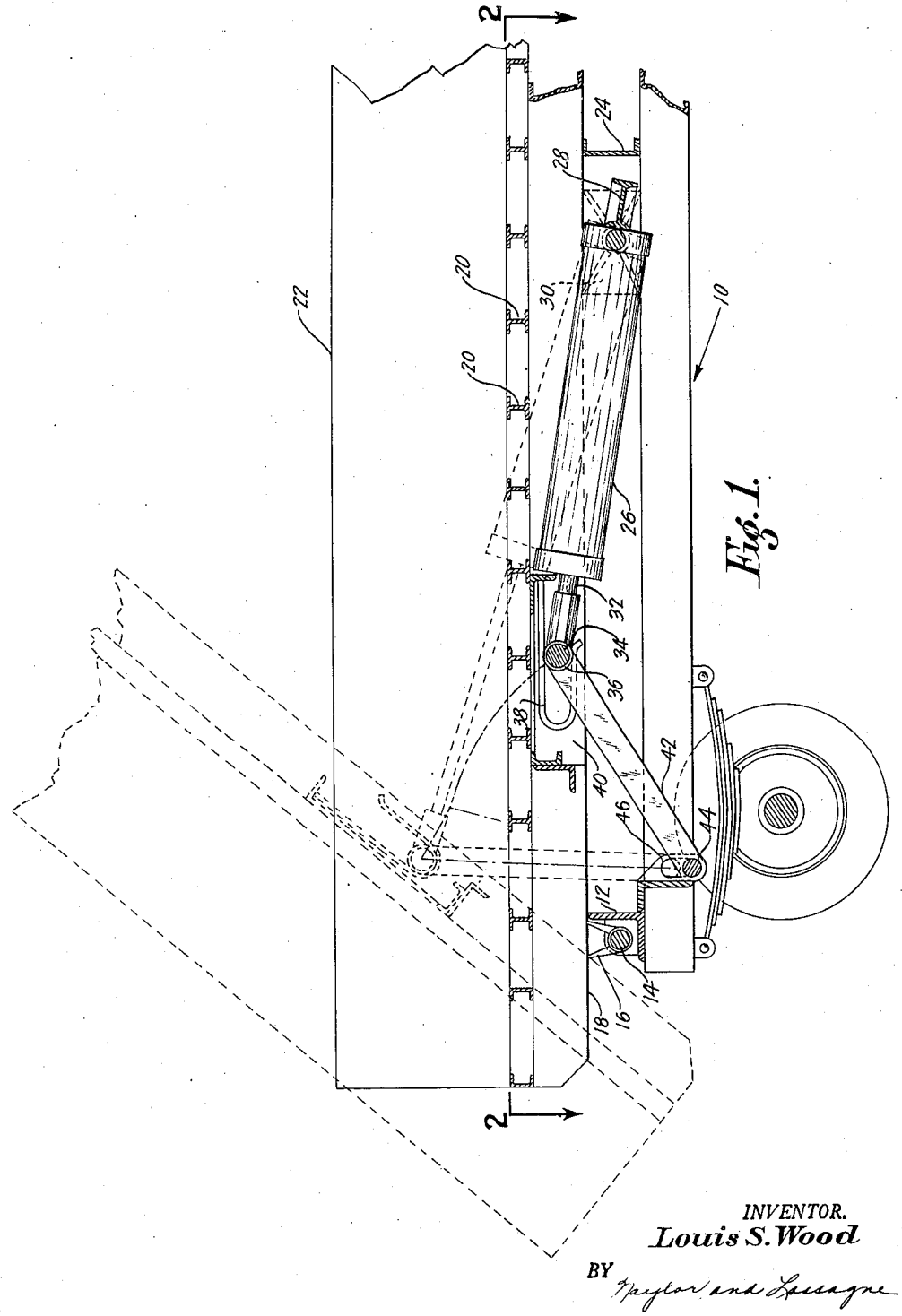
Figure 1 is a view in side elevation of a truck body embodying the hoisting mechanism of the invention, showing in dotted outline the body in its raised position.
Figure 2:
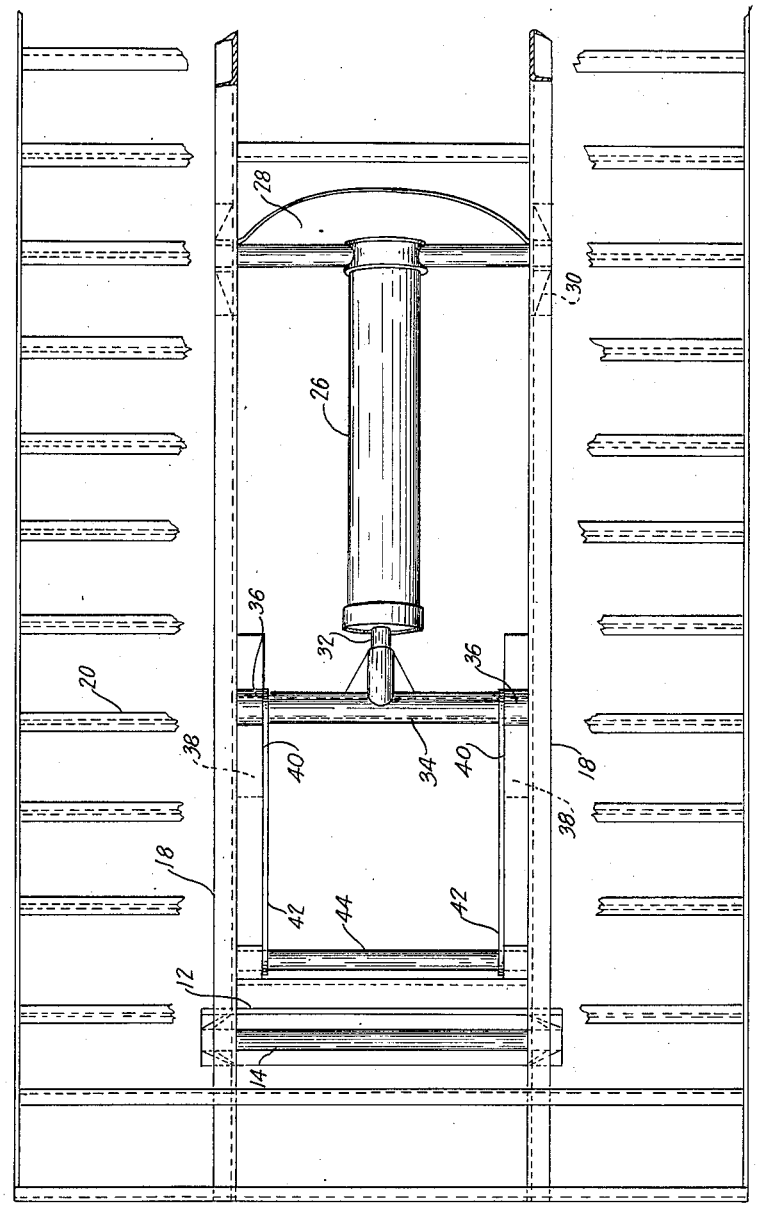
Figure 2 is a plan view of the truck body and hoisting mechanism taken along line 2—2 of Figure 1.
Figure 3:
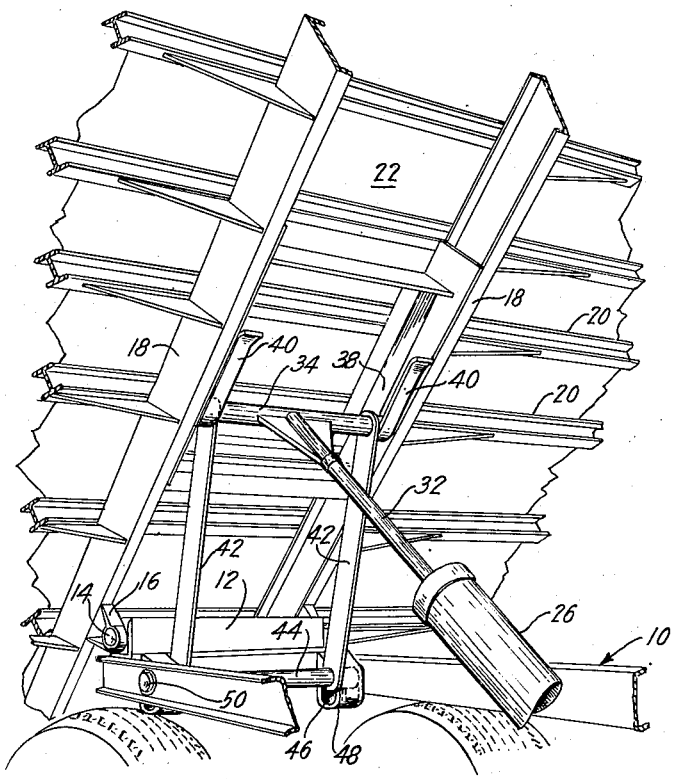
Figure 3 is a partial view in perspective of the underside of the truck body in its raised position.

Referring to the drawings for more specific details of the invention, 10 indicates generally a wheel supported truck chassis having a transverse bracket 12 fixedly supported at the rearward end thereof. The bracket 12 has journalled therein a shaft 14 on which there is pivotably secured by brackets 16 spaced side rails 18, said side-rails having secured thereto, as by welding, a plurality of transverse beams 20 which in turn have secured thereto a truck body 22. Suitable transverse beams, such as 24, secured to the chassis 10 serve as a support for the side-rails 18 when the body is in the down position.

A hydraulic cylinder 26 has one end thereof secured to a cradle 28 pivotably secured to support members 30 carried in oppositely disposed relation by the chassis 10, said cylinder having a piston arm 32 extending from the opposite end thereof and extensible with respect thereto. A cross-head 34 secured to the end of arm 32 has a roller 36 mounted for rotation at each of its ends, said rollers being adapted to travel in open-ended cam slots 38 in brackets 40 secured in oppositely disposed relation to the inner sides of the side-rails 18. Pivotally secured to the cross-head 34 adjacent each of the rollers 36 is a radius link 42, each of side links having their opposite ends pivotably secured to a shaft 44 carried for vertical movement within elongated slots 46 in oppositely disposed members 48 secured, as by bolts 50, to the inner sides of the chassis members 10.

The hydraulic cylinder 26 is provided with the conventional fluid inlet and outlet lines, not shown, and appropriate valve controls, also not shown, are provided for operation of the cylinder.

The hoisting mechanism is operable in the following manner. As pressurized fluid is admitted to the cylinder 26, the piston arm 32 is moved outwardly to move the cross-head 34 and rollers 36 in an arc path, the radius of curvature of which is the length of the radius links 42. The rollers 36 are simultaneously moved in the cam slots 38 toward the closed end thereof to initiate the hoisting of the body 22. It will be noted that at the outset of the hoisting operation, the thrust of the rollers 36 against the surfaces of the cam slots 38 is primarily a camming action and that the reactive thrust is principally provided by the members 48 against which bears the shaft 44 carried by the lower ends of the radius links 42. The shearing action on the body pivoting shaft 14 is thus reduced to a minimum.

As the body 22 is further hoisted, the rollers 36 approach the closed ends of the cam slots 38, and the camming action is progressively lessened as the direct thrust component of the rollers against the surfaces of the cam slots increases. The distance between the closed ends of the cam slots 38 and the axis of shaft 14 is so proportioned in relation to the length of the radius links 42, that the arc path described by the rollers 36 around shaft 44 and the arc path described by the closed ends of the cam slots 38 around shaft 14 are adapted to intersect when the rollers abut the closed ends of said cam slots. At this point of the hoisting operation, the camming action of the rollers in the cam slots ceases. Further hoisting action is caused solely by direct thrust of the rollers 36 against the cam slotted brackets 40, which action is effective to move the shaft 44 upwardly in the slots 46 to move the links 42 upwardly in a lost motion action. The fully direct thrust hoisting action continues until the shaft 44 carrying the lower ends of the links 42 abuts the upper ends of the slots 46, at which point the body hoisting operation ceases due to the limiting action of the radius links 42, any further pivoting of the body being impossible since this would tend to elongate the links 42.

In lowering the body to a horizontal position, the fluid pressure holding force in the cylinder 26 is released to allow the crosshead 34 to travel toward the cylinder and the shaft 44 to reach the bottom of the slots 46, whereupon the body 22 is lowered to a horizontal position by virtue of the gravity impelled direct thrust action of cam slot members 40 on the rollers 36, said direct thrust being gradually transformed to a camming action as the truck body approaches the fully down position.

While the preferred embodiment of the invention has been shown and described, it is understood that the embodiment is subject to modification within the spirit of the invention and the scope of the appended claims.

What I claim as new and desire to secure by Letters Patent is:

1. For a truck having a chassis frame and a dump body pivotably secured thereto, a hoisting mechanism comprising a driving member pivotably carried by the frame and adapted to lift the body, a thrust receiving member carried on the underside of the dump body having a cam slot adapted to receive the end of the driving member for sliding movement therein, said cam slot having a rearward end adapted to limit the sliding movement of said driving member, and a radius link connection between the driving member and the chassis frame embodying means operable to allow a limited sliding movement of said link in a substantially vertical direction when said driving member reaches the rearward end of said cam slot.

2. For a truck having a chassis frame and a dump body pivotably secured thereto, a hoisting mechanism for the dump body comprising a driving member pivotably carried by the frame and adapted to lift the body, a thrust receiving member carried on the underside of the dump body adapted to receive the end of the driving member for sliding movement limited by the rearward end of said thrust receiving member, and a radius link connection between the driving member and the chassis frame embodying means operable to allow a limited sliding movement of said link in a substantially vertical direction when said driving member reaches the rearward end of said thrust receiving member.

3. For a truck having a chassis frame and a dump body pivotably secured thereto, a hoisting mechanism for the dump body comprising a pair of spaced brackets affixed to the underside of the body an equal distance forwardly of the pivotal connection between the body and the frame, a cam slot in each bracket having a closed end, a driving member pivotably connected to the frame and having the end thereof mounted for travel in the cam slots toward the closed ends thereof, a pair of spaced radius links pivotably secured to said end of the driving member, the opposite ends of said links being pivotably carried by the chassis frame forward of the pivotal connection of the chassis frame and dump body, said frame ends of said links being carried by said frame for a substantially vertical limited sliding movement initiated by the driving member when said member reaches the closed ends of said cam slots.

4. For a truck having a chassis frame and a dump body pivotably secured thereto, a hoisting mechanism for the dump body comprising a pair of spaced brackets affixed to the underside of the body an equal distance forwardly of the pivotal connection between the body and the frame, a cam slot in each bracket having a closed end, a driving member pivotably connected to the frame and having the end thereof mounted for travel in the cam slots, said driving member being adapted to exert a progressively decreasing cam action and a progressively increasing direct thrust upon the brackets as said member travels in the slots to the closed ends of said slots to effect the hoisting of the body, a pair of spaced radius links each having one end pivotably secured to the bracket-connected end of the driving member and the other end carried by the chassis frame forward of the pivotal connection of the chassis frame and dump body for pivotal action and limited sliding movement in a substantially vertical direction, said links being adapted to move upwardly in a lost motion action upon the cessation of the camming action of the driving member and the initiation of a fully direct thrust action of said member in the cam slots of the brackets when said driving member reaches the closed ends thereof during the hoisting operation, and said links being further adapted to serve as limiting members for the degree of pivot of the body upon the cessation of upward movement of the links.

LOUIS S. WOOD.

REFERENCES CITED

The following references are of record in the file of this patent:

UNITED STATES PATENTS

| Number | Name | Date |
|---|---|---|
| 1,552,281 | Edwards | Sept. 1, 1925 |
| 1,693,874 | Sirot | Dec. 4, 1925 |
| 2,172,138 | Harley | Sept. 5, 1939 |
| 2,314,531 | Wachter | Mar. 23, 1943 |
| 2,370,489 | Reed | Feb. 27, 1945 |